(12) United States Patent
Soto

(10) Patent No.: US 12,261,444 B2
(45) Date of Patent: Mar. 25, 2025

(54) WIND POWER PLANT COLLECTOR SYSTEM

(71) Applicant: Siemens Gamesa Renewable Energy Innovation & Technology S.L., Sarriguren (ES)

(72) Inventor: Daniel Soto, Hamburg (DE)

(73) Assignee: SIEMENS GAMESA RENEWABLE ENERGY INNOVATION & TECHNOLOGY S.L., Sarriguren (ES)

( * ) Notice: Subject to any disclaimer, the term of this patent is extended or adjusted under 35 U.S.C. 154(b) by 14 days.

(21) Appl. No.: 17/927,393

(22) PCT Filed: Apr. 28, 2021

(86) PCT No.: PCT/EP2021/061120
§ 371 (c)(1),
(2) Date: Nov. 23, 2022

(87) PCT Pub. No.: WO2021/244806
PCT Pub. Date: Dec. 9, 2021

(65) Prior Publication Data
US 2023/0246450 A1     Aug. 3, 2023

(30) Foreign Application Priority Data
Jun. 4, 2020  (EP) .................................... 20382485

(51) Int. Cl.
*H02J 3/38*   (2006.01)
*F03D 9/25*   (2016.01)

(52) U.S. Cl.
CPC .............. *H02J 3/381* (2013.01); *F03D 9/255* (2017.02); *H02J 2300/28* (2020.01)

(58) Field of Classification Search
CPC .......... H02J 3/381; H02J 2300/28; H02J 3/36; F03D 9/255; Y02E 10/76; Y02E 60/60
(Continued)

(56) References Cited

U.S. PATENT DOCUMENTS 7,324,359 B2 *  1/2008  Schreiber ............ H02M 7/2176
                                          363/68
10,184,452 B2 * 1/2019  Tahata ..................... H02H 3/18
(Continued)

FOREIGN PATENT DOCUMENTS

CN          207237269          *    4/2018

OTHER PUBLICATIONS

International Search Report & Written Opinion for PCT/EP2021/061120, mailed on Jul. 15, 2021.

*Primary Examiner* — Richard Tan
(74) *Attorney, Agent, or Firm* — Schmeiser Olsen & Watts LLP

(57) ABSTRACT

A collector system for a wind power plant that includes one or more wind turbines is provided. The wind power plant collector system includes a DC collector grid, wherein the DC collector grid has a symmetrical monopole topology including a first pole and a second pole of opposite polarity. The DC collector grid is configured to collect electrical power generated by the one or more wind turbines and to transport the collected electrical power to a common converter by a DC current having a predetermined current direction in the DC collector grid. The common converter is connected to the DC collector grid, the common converter being configured to convert DC electrical power received from the DC collector grid and to provide the converted electrical power to a load.

15 Claims, 3 Drawing Sheets

(58) Field of Classification Search
USPC .......................................................... 307/84
See application file for complete search history.

(56) References Cited

U.S. PATENT DOCUMENTS

| | | | |
|---|---|---|---|
| 10,992,233 B2* | 4/2021 | Dincan | H02M 3/01 |
| 2012/0175962 A1* | 7/2012 | Zhan | H02J 1/102 |
| | | | 307/82 |
| 2013/0197704 A1 | 8/2013 | Pan et al. | |
| 2018/0013280 A1 | 1/2018 | Barker | |
| 2020/0059095 A1* | 2/2020 | Adamczyk | H04B 3/54 |

* cited by examiner

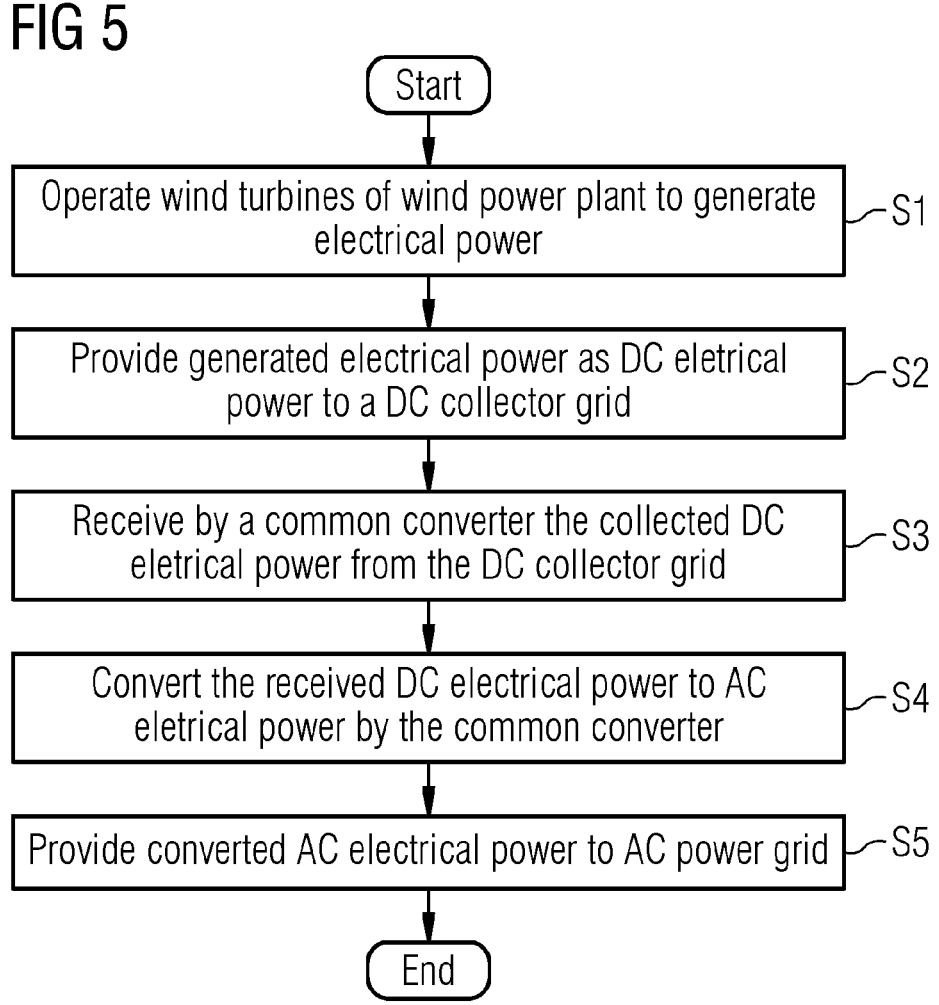

WIND POWER PLANT COLLECTOR SYSTEM

CROSS-REFERENCE TO RELATED APPLICATIONS

This application claims priority to PCT Application No. PCT/EP2021/061120, having a filing date of Apr. 28, 2021, which claims priority to European Application No. 20382485.9, having a filing date of Jun. 4, 2020, the entire contents both of which are hereby incorporated by reference.

FIELD OF TECHNOLOGY

The following relates to a collector system for a wind power plant that includes one or more wind turbines, to a wind power plant comprising such collector system and to a method of collecting electrical power generated by one or more wind turbines of a wind power plant.

BACKGROUND

A wind power plant generally includes one or more, mostly a plurality of wind turbines that generate electrical power from the available wind energy. A wind power plant often includes a local power plant grid by which the electrical power is collected from the different wind turbines. Typically, such collector grid is an AC grid that receives the electrical power from a wind turbine transformer, which is provided for each wind turbine. The collected electrical power is then transformed by a common transformer to a voltage level suitable for transmission via a utility power grid or a local power grid. A respective substation including a substation transformer may for example be provided. Such AC collector grids have several benefits and can make use of conventional electric components. However, the electrical power needs to be provided by the wind turbines at the AC frequency of the respective power grid, such as at 50 or 60 Hz.

DC (Direct Current) collector systems have furthermore been proposed in which DC links are used to transport the electrical power from the wind turbines to a point of common coupling, at which the electric power is provided to the power grid. A voltage source converter may then be provided to convert the DC electrical power received from the DC collector system to AC electrical power having the frequency required by the power grid operator. Fault currents that may occur in the DC links of such DC collector system are however a matter of concern. In particular, upon occurrence of a ground fault in a DC link, fault currents can be very high due to the high current contribution from the AC power grid. Voltage source converters generally do not block such currents. Providing a voltage source converter capable of blocking such currents is associated with high costs that make such DC collector system economically less feasible. Likewise, the providing of additional devices, such as DC breakers, is associated with high costs. Shunt reactors and other measures likewise increase costs and complexity, and further reduce the efficiency. It is therefore desirable to make such DC collector system more feasible.

The document US 2013/197704 A1 describes a connection scheme for offshore power generation with an internal medium voltage DC collection grid. The grid is provided with plural DC circuit breakers at different locations to provide protection and to be able to isolate parts of the collector grid.

The document US 2018/013280 A1 discloses a HVDC transmission network between an offshore wind farm and an onshore AC network. The offshore windfarm includes a conventional AC collector grid. The power converters employed in the HVDC transmission are operable in a fault blocking mode in which the transfer of current from the associated AC network to the DC transmission line is blocked.

SUMMARY

An aspect relates to a collector system for a wind power plant that is less complex and more cost-efficient, and that does not require the wind turbines to provide the generated electric power at a fixed frequency.

According to an embodiment of the invention, a wind power plant collector system for a wind power plant that includes one or more wind turbines is provided. The collector system comprises a DC collector grid, wherein the DC collector grid has a symmetrical monopole topology which includes a first pole and a second pole of opposite polarity. The DC collector grid is configured to collect electrical power generated by the one or more wind turbines and to transport the collected electrical power to a common converter by a DC current having a predetermined current direction in the DC collector grid. The system further comprises the common converter connected to the DC collector grid, wherein the common converter is configured to convert DC electrical power received from the DC collector grid and to provide the converted electrical power to a load.

Such collector system does accordingly not require the wind turbines to provide the generated electrical power at a certain frequency. Rather, it is sufficient for the wind turbine to convert generated AC electric power to DC, which may then directly be fed into the DC collector grid. For a conventional full converter solution of the wind turbine, only the AC to DC converter section would be required (i.e. the machine side converter), resulting in reduced complexity and costs associated with the wind turbines. Furthermore, the symmetrical monopole topology provides enhanced protection against faults, such as ground faults. For example, for a single pole to ground fault of such symmetrical monopole configuration, the power transfer is not lost during the fault, since the DC current can still flow and the pole-to-pole voltage stays the same (one of the poles now being referenced to ground). Furthermore, there is no surge of fault current flowing through the common converter. Accordingly, it is not necessary to provide the common converter with a current blocking capability that is capable of blocking fault currents flowing from the load, in particular the AC power grid, to the fault in the DC collector grid or wind turbine.

The common converter may also be termed "central converter", as it provides a central electrical power conversion for wind turbines of the wind power plant, or it may also be termed "remote converter", as it is remote from the wind turbines. The common converter may for example convert the electrical power generated by all wind turbines of the wind power plant (which doesn't exclude that only one wind turbine is present), or of plural wind turbines of the wind power plant. It should be clear that plural common converters may be provided, for example for larger wind power plants having a high number of wind turbines. In an embodiment, the wind power plant comprises two, three, or more wind turbines providing generated electric power to the common converter for conversion. The DC current flows through the common converter in the predetermined current direction.

The load may in particular be an AC power grid, wherein it should be clear that a transformer and/or other equipment may be coupled between the common converter and the AC power grid. In other implementations, the load may also be a DC grid or an AC or DC transmission line, an island AC grid, or another load, such as an industrial facility.

The poles may for example be provided by lines of the collector grid that have a respective polarity. The polarity may for example be referenced to a common mean value, and may be considered as positive or negative with respect to such mean value, wherein the mean value may for example be ground. The DC collector grid may accordingly include lines (in particular cables) connecting positive terminals of the wind turbines to a positive terminal of the common converter and lines connecting negative terminals of the wind turbines to a negative terminal of the common converter (directly or via one or more intervening components).

In an embodiment, the collector system further comprises a first current blocking device having a blocking direction in which current flow is substantially blocked and a conduction direction in which current is conducted. The first pole of the DC collector grid may be connected to a first terminal of the common converter via the first current blocking device such that the conducting direction of the first current blocking device corresponds to the predetermined current direction in the DC collector grid. In normal operation, when the wind turbines produce electrical power that is provided via the DC collector grid to the load, the first blocking device accordingly passes the DC current in the predetermined current direction. On the other hand, upon the occurrence of a fault, the first blocking device efficiently blocks any currents flowing in the opposite direction, i.e. the blocking direction, for example currents originated at the common converter and flowing towards a fault in the first pole of the DC collector grid. A simple and efficient protection against such fault currents can thus be provided. In particular, it is not required to provide a more complex common converter having fault current blocking capability, or the providing of additional protection equipment, such as DC circuit breakers which are costly and difficult to implement.

In an embodiment, the collector system further comprises a second current blocking device having a blocking direction in which current flow is substantially blocked and a conduction direction in which current is conducted, wherein the second pole of the DC collector grid is connected to a second terminal of the common converter via the second current blocking device such that the conducting direction of the second current blocking device corresponds to the predetermined current direction. Such second current blocking device may likewise pass the DC current in the DC collector grid during normal operation, whereas current flows between the common converter and a fault in the second pole of the DC collector grid are efficiently blocked. As another example, a fault that may occur is a flash-over in the cables or conductors constituting the first and second poles of the symmetrical monopole configuration of the DC collector grid. The first and/or second current blocking device efficiently blocks a fault current from the first terminal to the second terminal of the common converter, such fault current being for a large part originated by the load (e.g. the AC power grid, DC power grid, or transmission line).

The first pole and the first terminal may for example be a positive pole/terminal, and the second terminal may be a negative pole/terminal. In an embodiment, both, a first current blocking device and a second current blocking device, are provided. The first and/or second current blocking device may for example be connected between the first pole of the DC collector grid and the first terminal of the common converter, and between the second pole of the DC collector grid and the second terminal of the common converter, respectively. It should be clear that in normal operation, the current flow in the first pole and in the second pole are in opposite direction, so that the first and second current blocking devices are also connected such that their conducting directions are opposite (i.e. the first current blocking device passes currents towards the common converter, and the second current blocking device passes currents flowing away from the common converter).

In particular, the first and second current blocking devices are connected such that in operation, they conduct DC current in the DC collector grid in the predetermined current direction so as to enable the transport of electrical energy from the one or more wind turbines to the common converter.

The first current blocking device and/or the second current blocking device may be a diode device that comprises one or more diodes configured to provide the conduction of the current in the conducting direction, and to block current in the blocking direction. The current blocking devices may thus be implemented in a rather simple and cost-efficient way and have only very limited complexity. The collector system can therefore be simple and efficient, and can provide effective protection against fault currents while at the same time, costs can be kept low.

In particular, the first and/or second current blocking device may include plural diodes that are connected in series and/or in parallel. By connecting more diodes in parallel, the current capacity of the current blocking device may be increased. By connecting more diodes in series, the voltage blocking capability of the current blocking device may be increased, i.e. the breakdown voltage of the current blocking device may be increased.

The first and/or second current blocking device may be connected closer to the common converter than to each of the one or more wind turbines. In an embodiment, it is connected close to or directly adjacent to the common converter. In other words, any conductor between the converter and the respective ground blocking device may be short compared to conductors, in particular to the lines, connected between the current blocking device and the wind turbine. The current blocking device may in particular be connected directly to the respective terminal of the common converter. The probability that a fault occurs in any connection between the common converter and the respective current blocking device can thus be kept low. If a fault nevertheless occurs in such conductor, the length of conductor exposed to the respective fault current is rather short. Although it is conceivable that the first and/or second current blocking devices are implemented in the common converter, it is preferred that the first and/or second current blocking devices are distinct from the common converter.

In an embodiment, the first and/or second current blocking devices are connected such that the main part of the DC current in the DC collector grid that is provided to the common converter passes through the respective first and/or second current blocking devices, in particular more than 50%, 80% or 90% of the current.

In some embodiments, the collector system may further comprise a bypass element, in particular a bypass resistor, that is connected in parallel to the first and/or second current blocking device. In an embodiment, a respective bypass element is connected parallel to each of the first and second current blocking devices. Such bypass element may allow a bidirectional current flow and may thus allow a current flow in a direction that is reverse to the predetermined direction of the DC current in the DC collector grid. This allows the providing of electrical power to the wind turbines from the load (for example from an AC power grid or DC power grid) via the common converter. In other words, it allows the common converter to operate as a power source. Such operation is for example useful for starting up of the wind turbines, or during maintenance of the wind turbines, where the wind turbines do themselves not produce any electric power. The common converter may accordingly be configured to be operable in reverse direction, i.e. it may pass electric power from the load (AC power grid) to the DC collector grid.

The bypass element may for example be configured to provide a current flow in the blocking direction of the respective first or second current blocking device. In an embodiment, the bypass current through the bypass element is (significantly) smaller than a current in the conducting direction of the respective first or second current blocking device at nominal operating conditions, in particular at a nominal operating voltage. For example, a resistance value of a resistor that constitutes the bypass element may be such that the current level in this bypass path is kept low. The current may for example be at least ten times smaller than the current that is passed through the current blocking device in normal operation. Accordingly, even when a fault occurs, the fault currents through the bypass element can be kept low.

In an embodiment, the common converter is a DC-to-AC converter. The common converter is configured to convert DC electrical power received from the DC collector grid to AC electrical power and to supply the converted AC electrical power to the load, which includes an AC power grid. The converter may thus be connected directly or indirectly to the AC power grid.

In an embodiment, the converter is a voltage source converter. In an embodiment, the converter is a modular multilevel converter (MMC).

The converter may comprise semiconductor switches configured to perform the conversion of the received DC electrical power, wherein the converter may not be capable of interrupting currents, in particular fault currents, flowing towards the DC collector grid. For example, when a ground fault or a flash-over in cables of the DC collector grid occurs, the common converter may not be capable of interrupting the fault current flowing from a connected AC power grid, DC power grid or transmission line towards the DC collector grid.

Although the common converter is a DC-to-AC converter configured to provide a predominantly unidirectional power flow from the DC collector grid towards the load in form of an AC power grid or transmission line, other embodiments are conceivable in which the common converter is a DC-to-DC converter providing the converted electrical power to a DC transmission line or DC power grid.

In an embodiment, the DC collector grid having the symmetrical monopole topology has no earth return. The DC collector grid may in particular have conductors providing the first and second poles, the DC current flowing only in the respective conductors.

The first and second poles of the symmetrical monopole topology are ungrounded, or they may be high-resistance grounded. The first pole and the second pole may provide a positive pole and a negative pole with respect to such ground. High-resistance grounding is commonly known and refers to the fact that the respective pole is not at the same potential as ground, wherein only low currents to ground are present during normal operation.

In some embodiments, the collector system may further comprise a DC-to-DC converter connected between the at least one wind turbine and the DC collector grid. Such DC-to-DC converter may for example be used to step-up the DC voltage for transmission via the DC collector grid. A more efficient transmission of the electrical power generated by the one or more wind turbines to the common converter may thus be achieved. Such DC-to-DC converter may be provided between each wind turbine of the power plant and the DC collector grid; the DC-to-DC converter may for example be included in the wind turbine.

In some embodiments, the collector system may further comprise an AC-to-DC converter connected to a generator of the at least one wind turbine, the AC-to-DC converter being coupled to the DC collector grid and being configured to convert AC electrical power generated by the generator to DC electrical power, and to provide the DC electrical power to the DC collector grid. The generator may be any type of generator commonly used in wind turbines, such as a permanent magnet synchronous generator (PMSG), an induction generator, in particular a doubly-fed induction generator (DFIG), or the like.

The DC collector grid may include at least two strings connected in parallel, wherein in each string at least one wind turbine is connected to the DC collector grid. The DC collector grid may accordingly include plural strings each with one wind turbine, so that all wind turbines are connected in parallel in the DC collector grid. In other configurations, the DC collector grid may include one or more strings in which at least two wind turbines are connected in series. It may for example include a single string with plural wind turbines connected in series, or it may include several strings that are connected in parallel, wherein two or more wind turbines are connected in series in each string. In an embodiment, the same number of wind turbines is connected in series in each string. By connecting wind turbines that provide DC electrical power in series, the voltage level may be increased up to a level desired for transmission via the DC collector grid to the common converter. There may accordingly be no need for an additional DC-to-DC converter in such configuration for stepping up the DC voltage.

The DC voltage level on the DC collector grid may for example lie within a range of 500 V to 50.000 V, it may for example be a low-voltage range of 600 to 1000 V or a medium-voltage range of 1000 to 50.000 V.

According to a further embodiment of the invention, a wind power plant that comprises the collector system having any of the configurations described herein is provided. The wind power plant may for example include one, two or more wind turbines that are connected to the DC collector grid and provide generated electrical power to the common converter. With such wind power plant, advantages similar to the ones outlined further above may be achieved.

According to a further embodiment of the invention, a method of collecting electrical power generated by one or more wind turbines of a wind power plant is provided. The method comprises collecting electrical power generated by the one or more wind turbines by a DC collector grid, wherein the DC collector grid has a symmetrical monopole topology including a first pole and a second pole of opposite polarity. The method further includes transporting the collected electrical power to a common converter by a DC current having a predetermined current direction in the DC collector grid, and converting, by the common converter connected to the DC collector grid, DC electrical power received by the common converter from the DC collector grid. The converted electrical power is provided to a load, which may for example be an AC power grid.

The method may be performed by a collector system or a wind power plant having any of the configurations described herein. Furthermore, any of the method steps described with respect to such collector system or wind power plant may form part of embodiments of the method. Embodiments of the method may achieve advantages that are similar to those outlined further above.

It is to be understood that the features mentioned above and those yet to be explained below can be used not only in the respective combinations indicated, but also in other combinations or in isolation, without leaving the scope of embodiments of the present invention. In particular, the features of the different aspects and embodiments of the invention can be combined with each other unless noted to the contrary.

BRIEF DESCRIPTION

Some of the embodiments will be described in detail, with reference to the following figures, wherein like designations denote like members, wherein:

FIG. 5 is a flow diagram schematically illustrating a method according to an embodiment of the invention.

DETAILED DESCRIPTION

Figure 1:
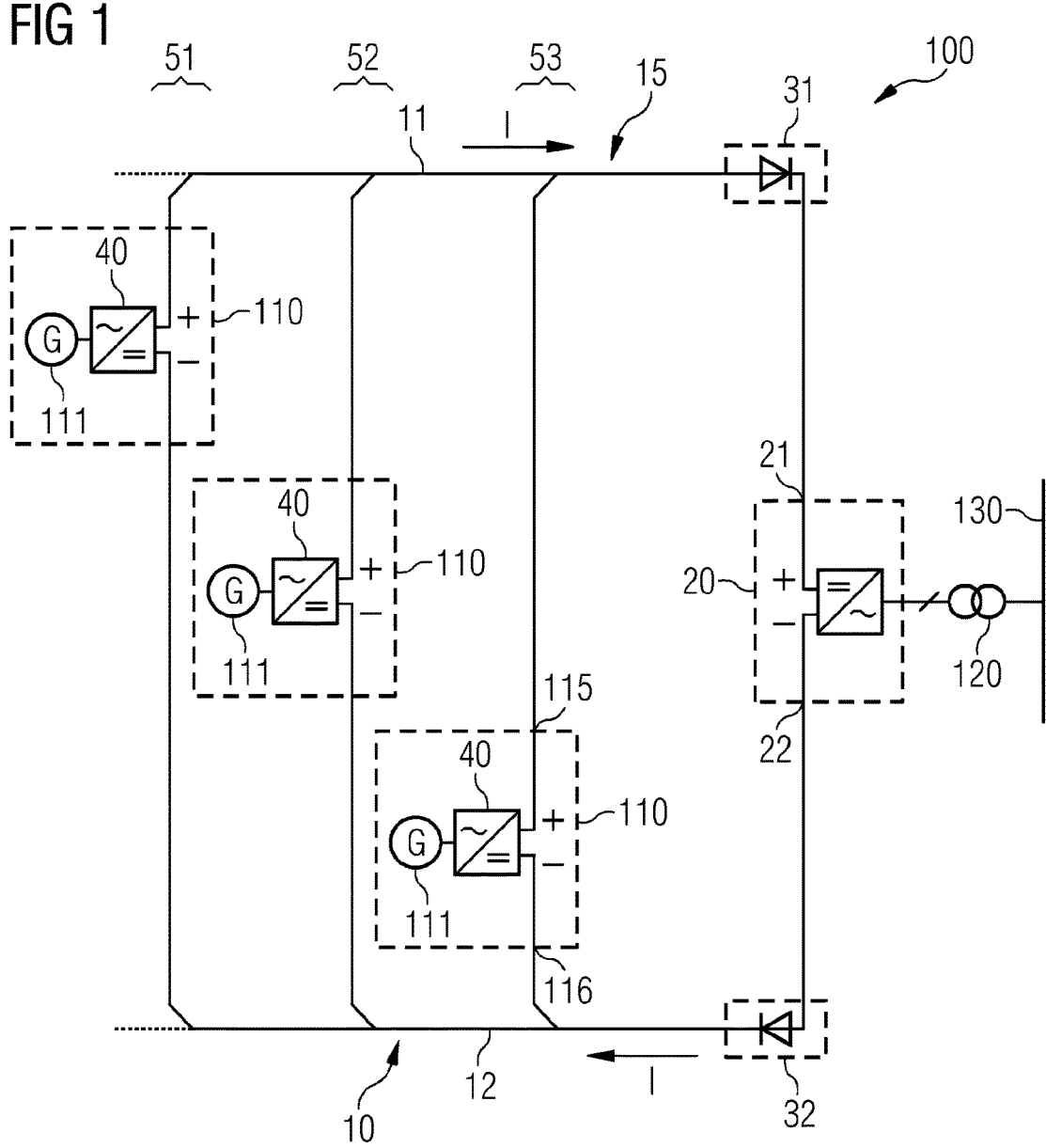
FIG. 1 is a schematic drawing showing a wind power plant collector system according to an embodiment of the invention.

In the following, embodiments of the invention will be described in detail with reference to the accompanying drawings. It is to be understood that the following description of the embodiments is given only for the purpose of illustration and is not to be taken in a limiting sense. It should be noted that the drawings are to be regarded as being schematic representations only, and elements in the drawings are not necessarily to scale with each other. Rather, the representation of the various elements is chosen such that their function and general purpose become apparent to a person skilled in the art. As used herein, the singular forms "a," "an," and "the" are intended to include the plural forms as well, unless the context clearly indicates otherwise. The terms "comprising," "having," "including," and "containing" are to be construed as open-ended terms (i.e., meaning "including, but not limited to,") unless otherwise noted.

FIG. 1 schematically illustrates a wind power plant 100 and a wind power plant collector system 10 according to an embodiment. The wind power plant 100 includes one or more wind turbines 110, three such wind turbines being exemplarily shown in FIG. 1. In operation, the wind turbines 110 generate electrical power which is provided via the collector system 10 to a load 130, which in the present example is an AC power grid. For this purpose, the collector system 10 includes a DC collector grid 15 to which the wind turbines 110 are connected. It further includes a common converter 20 that in the present example is a DC-to-AC converter. Converter 20 converts DC electrical power received from the DC collector grid 15 to AC electrical power that is supplied, via a transformer 120, to the load 130, in particular to the AC power grid. It should be clear that in other configurations, no such transformer 120 may be provided, or the common converter 20 may be a DC-to-DC converter, supplying the power to a load in form of a DC power grid.

The DC collector grid 15 has a symmetrical monopole topology that includes a first pole 11 and a second pole 12. In such configuration, the first and second poles 11, 12 have opposite polarity, and no earth return is provided. The current in the two poles 11, 12 of the DC collector grid 15 is the same in normal operating conditions, i.e. the current flows in a predetermined current direction in the respective poles that is indicated by arrow I in FIG. 1.

In the example of FIG. 1, the common converter 20 has a first terminal 21 being a positive terminal and a second terminal 22 being a negative terminal. The wind turbines 110 have a respective first (positive) terminal 115 and second (negative) terminal 116. The DC collector grid 15 comprises electric conductors, in particular transmission cables, that provide an electric connection between the positive terminal 115 of the wind turbines and the positive terminal 21 of the common converter 20. Further, they include electric conductors, in particular transmission cables, that provide an electric connection between the negative terminals 116 of the wind turbines 110 and the negative terminal 22 of the common converter 20.

In normal operating conditions, the wind turbines 110 act as a power source, so that a current flows from the positive terminal 115 of the wind turbines through the common converter 20 back to the negative terminal 116 of the wind turbines, as indicated by arrows I (following the general convention according to which currents flow from positive to negative potential).

Converter 20 is a voltage source converter and is a modular multilevel converter (MMC). It is configured to convert the DC electric power received from the DC collector grid 15 to the AC electric power at the desired AC frequency, such as 50 Hz or 60 Hz.

In the example of FIG. 1, the DC collector grid 15 comprises three strings 51, 52, 53 that are connected in parallel. In each string, a single wind turbine is provided. In other embodiments (see FIG. 4), plural wind turbines may be connected in series in each string.

Besides providing a DC output, the wind turbines 110 may have a conventional configuration. They may in particular include a wind turbine rotor (not shown) that is mechanically coupled to a generator 111 that generates AC electrical power from the received mechanical power. Each wind turbine may furthermore include an AC-to-DC converter 40 that converts the generated AC electrical power to DC electrical power that is provided at a respective DC output of the wind turbine 110, in particular at the output terminals 115, 116. Converter 40 may generally form part of the wind turbine 110. In other configurations, the converter 40 may form part of the collector system 10, and the wind turbine may provide AC electrical power at a respective power output, which may for example be the power output of the generator 111. Furthermore, the wind turbine 110 or the collector system 10 may include a DC-to-DC converter that is connected to the DC output of the converter 40. Such DC-to-DC converter may be used to bring the DC voltage up to a desired level (step-up converter) in order to provide an efficient transfer of the electrical energy to the common converter 20. It should be clear that different types of wind turbines may be mixed in the wind power plant 100, and accordingly, respective converters 40 and/or DC-to-DC converters may be provided by the collector system 10 for some wind turbines while they may not be provided for other wind turbines.

The collector system 10 furthermore includes a first current blocking device 31 and a second current blocking device 32. These are coupled in the DC collector grid such that the DC current flows from the first terminal 115 of the wind turbine 110 through the DC collector grid and the first current blocking device 31 to the common converter 20, and from the common converter 20 through the second current blocking device 32 to the second terminal 116 of the wind turbine 110. It should be clear that the current blocking devices 31, 32 may be connected at any position in the DC collector grid 15, yet they are connected close to the common converter 20. They may for example be connected adjacent to the converter 20, and in particular directly to the terminals 21, 22 of the converter 20. It should further be clear that in each pole 11, 12, plural such current blocking devices 31, 32 may be provided, although it is preferable to provide a single current blocking device for each pole.

One terminal of the current blocking device 31, 32 is connected to a terminal of the common converter 20, for example via a respective conductor, cable or the like. The other terminal of the current blocking device 31, 32 is connected to a transmission cable of the DC collector grid 15. A fault, such as a flash-over fault or a ground fault, is more likely to occur within the transmission cables of the DC collector grid 15. Accordingly, by connecting the current blocking devices 31, 32 close to the common converter 20, the fault currents for most of the faults that may occur within the collector system 10 can be blocked.

Each current blocking device 31, 32 has a conducting direction in which it conducts electric current. It further has a blocking direction that is opposite to the conducting direction in which it blocks electric currents. The current blocking devices 31, 32 are coupled in the DC collector grid 15 such that the DC current indicated by arrow I in the predetermined direction is passed. Accordingly, in normal operating conditions, the current blocking devices 31, 32 do not impede the current flow from the wind turbines to the common converter 20 (besides some residual resistance which may certainly exist). However, the current blocking devices 31, 32 block any flow of current in the opposite direction, i.e. in a direction opposite to the direction indicated with arrows I in FIG. 1.

In a conventional system, if a fault occurs, for example a flash-over fault between conductors that constitute the first and second poles 11, 12, fault currents originated by the AC power grid 130 are a major problem. In particular, the common converter 20 would start to act as a power source and provide electrical power from the power grid 130 into the DC collector grid 15, the poles of which are short-circuited via the flash-over fault. Accordingly, in view of the current providing capability of the power grid 130, excessive fault currents can occur in such situation. As indicated above, the common converter 20 may in particular not be capable of blocking such fault currents, since providing a respective current blocking capacity may be difficult to implement and may result in prohibitive costs of such converter.

In such fault situation, the current flows from the positive terminal 21 of the common converter 20 to the negative terminal 22 via the short-circuited first and second poles 11, 12. Accordingly, current is in the reverse direction to the direction I indicated in FIG. 1. Therefore, such fault current is blocked by the current blocking devices 31, 32. The collector system 10 of FIG. 1 can thus implement a simple and cost-efficient protection against such fault currents.

The situation is similar when a ground fault occurs. The current blocking device 31 would prevent any fault current flowing from the positive terminal 21 to ground. Likewise, the second current blocking device 32 would prevent any fault current flowing from ground to the negative terminal 22 of the common converter 20, if a ground fault exists in the second pole 12. Consequently, the collector system 10 provides efficient fault protection against flash-over faults and ground faults.

Figure 2:
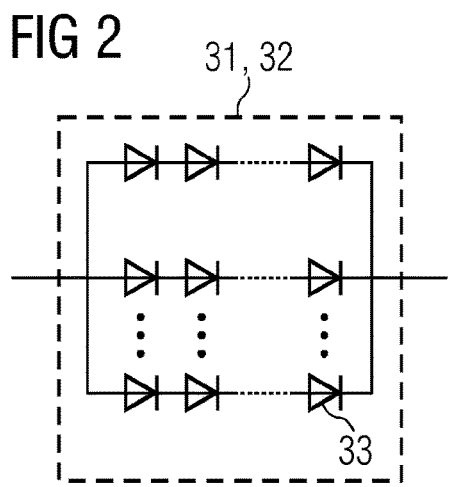
FIG. 2 is a schematic drawing showing a current blocking device according to an embodiment of the invention.

FIG. 2 illustrates a possible implementation of the first/second current blocking devices 31, 32. The current blocking device can include one or more diodes 33 connected between input and output terminals of the current blocking device. The current blocking device can be adapted to the desired current and voltage characteristics by connecting plural diodes in series and/or in parallel. To increase the current conducting capability of the device, additional diodes may be connected in parallel. Furthermore, to increase the breakdown voltage of the device, plural diodes may be connected in series. The voltage drop across each diode is then reduced. As can be seen, the current blocking devices 31, 32 can be produced cost-efficiently and have only a very limited complexity.

Figure 3:
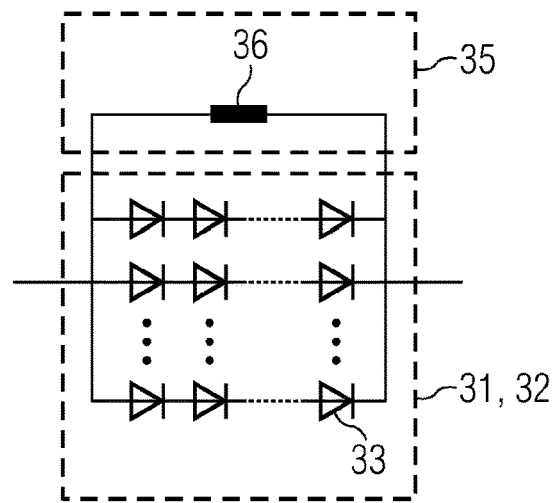
FIG. 3 is a schematic drawing showing a current blocking device and a bypass element according to an embodiment of the invention.

FIG. 3 illustrates an implementation in which in addition to the respective current blocking device 31, 32, a bypass element 35 is provided that is connected in parallel to the current blocking device. A respective bypass element 35 may be provided for each of the current blocking devices 31, 32 shown in FIG. 1. The bypass element 35 may for example include a bypass resistor 36 that is connected in parallel to the current blocking device. It should be clear that the bypass element 35 may include plural such resistors 36, connected in series or in parallel, to achieve the desired characteristics.

The bypass element 35 allows a bypass current to flow in the direction opposite to the current direction indicated by arrows I in FIG. 1. The resistance 36 can be chosen high so that the bypass current is low. In particular when a fault occurs, the resistor 36 is chosen such that the fault current that flows via the bypass element 35 is kept relatively low. The bypass resistor 36 may for example be chosen such that the bypass current in the case of a fault does not exceed (significantly) the nominal operating current of the DC collector grid.

In some situations, it may be necessary to supply electrical power from the power grid 130 to the wind turbines 110. Such power supply may for example be required for starting-up of the wind turbines 110, or during maintenance operation in order to turn the rotor of the wind turbines 110 to a desired position. The common converter 20 may then operate with a reverse power flow in which AC electrical power provided from the power grid 130 is converted to DC electrical power that is supplied via the DC collector grid 15 to the wind turbines 110. The bypass element 35, the respective current is allowed to bypass the current blocking elements 31, 32, thus ensuring a supply of the wind turbines 110 with electrical power. An efficient way of implementing fault protection while at the same time allowing the supply of the wind turbines 110 with electric power may thus be provided.

It should be clear that in operation, most of the current that transports the electrical power generated by the wind turbines 110 to the common converter 20 passes through the current blocking devices 31, 32. More than 50, 80 or 90% of the current supplied to the common converter 20 may pass through the current blocking devices 31, 32. In an embodiment, all of the current passes through these current blocking devices 31, 32 (except any current passing through bypass element 35, if present).

It should be clear that in some configurations, the collector system 10 may include further common converters 20 coupled by a respective DC collector grid 15 to further wind turbines 110. For example in larger wind power plants with a plurality of wind turbines, the providing of plural common converters 20 may be beneficial, both for reasons of redundancy and for keeping the maximum current and power rating at bay. For each DC collector grid 15 and associated common converter 20, respective first and second current blocking devices 31, 32 may then be provided.

Figure 4:
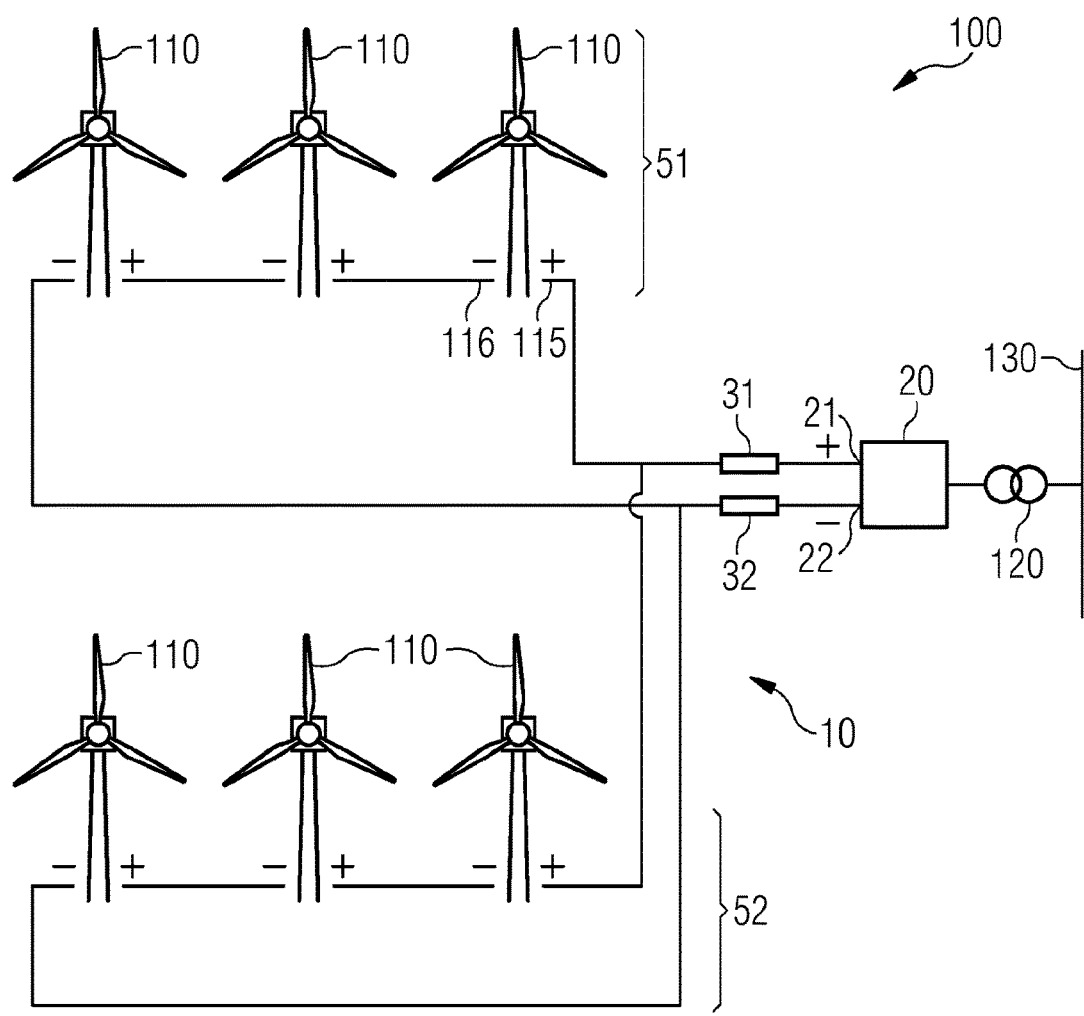
FIG. 4 is a schematic drawing showing a wind power plant collector system according to an embodiment of the invention.

FIG. 4 illustrates a wind power plant 100 and a collector system 10 according to a further embodiment. The explanations provided above with respect to FIGS. 1, 2 and 3 are equally applicable to the embodiment of FIG. 4. In the embodiment of FIG. 4, the collector system 10 comprises two strings 51, 52 that are connected in parallel. In each string, three wind turbines 110 are connected in series. By such series connection of the wind turbines, the voltage level in the respective string of the DC collector grid can be increased, which may make the transport of the electrical power to the common converter 20 more efficient. Such series connection may remove the need for a DC-DC step-up converter. It should be clear that in each string 51, 52, further wind turbines may be connected in series, or fewer wind turbines may be provided. Furthermore, it should be clear that the collector system 10 may include further strings, each including a respective number or a different number of series connected wind turbines.

In the above embodiments, the transmission cables of the DC collector grid 15 may for example include separate cables for providing the first and second poles 11, 12, or may include a common cable having two cores for providing the first and second poles 11, 12.

FIG. 5 shows a flow-diagram schematically illustrating a method according to an embodiment. In step S1, the wind turbines 110 of the wind power plant 100 are operated to generate electrical power. The electrical power may for example be generated by the generators 111 and may then be converted to DC by the converters 40. The DC electrical power is then provided to the DC collector grid 15 in step S2. The DC electrical power is received at the common converter 20 (step S3) and is converted to AC electrical power (step S4). The converted AC electrical power is then provided to the AC power grid 130 in step S5, for example via the transformer 120. The respective method may be performed by the collector system 10 and the wind power plant 100 in any of the above described configurations.

As outlined above, by such method, an efficient collection of the generated electrical power may be achieved, wherein the wind turbines 110 are not required to provide the electrical power at a particular AC frequency. Furthermore, such method of collecting the electrical power in the wind power plant 100 benefits from an improved protection against fault currents without the need to provide the common converter 20 with a current blocking capability or to provide expensive and complex protection equipment, such as DC circuit breakers.

The current blocking devices 31, 32, which can be implemented as simple semiconductor devices and that limit reverse currents, a low-cost, low-loss, and low volume/weight device that has sufficient current limiting capacity can be provided. These current blocking devices can in particular remove the need to provide for wind power plants with a predominantly unidirectional power flow complex, bulky or expensive protection equipment for handling fault currents. By the symmetrical monopole configuration of the DC collector grid, a simple ground fault will further not result in a loss of the load current provided from the wind turbines 110 to the common converter 20, thereby rendering the system fault tolerant.

Although the present invention has been disclosed in the form of embodiments and variations thereon, it will be understood that numerous additional modifications and variations could be made thereto without departing from the scope of the invention.

For the sake of clarity, it is to be understood that the use of "a" or "an" throughout this application does not exclude a plurality, and "comprising" does not exclude other steps or elements.

The invention claimed is:

1. A wind power plant collector system for a wind power plant, the wind power plant including one or more wind turbines, the wind power plant collector system comprising:
   a DC collector grid, wherein the DC collector grid has a symmetrical monopole topology including a first pole and a second pole of opposite polarity, wherein the DC collector grid is configured to collect electrical power generated by the one or more wind turbines and to transport the collected electrical power to a common converter by a DC current having a predetermined current direction in the DC collector grid;
   a first current blocking device and a second current blocking device positioned within the DC collector grid, the first current blocking device and the second current blocking device each having a plurality of diodes connectable in series and parallel in between input terminals and output terminals of the first current blocking device and the second current blocking device, respectively;
   wherein the common converter is connected to the DC collector grid, the common converter being configured to convert DC electrical power received from the DC collector grid and to provide the converted electrical power to a load;
   wherein, in normal operating conditions, current flows from positive terminals of the one or more wind turbines directly to the plurality of diodes of the first current blocking device.

2. The wind power plant collector system according to claim 1, wherein the first current blocking device has a blocking direction in which current flow is substantially blocked and a conducting direction in which current is conducted, wherein the first pole of the DC collector grid is connected to a first terminal of the common converter via the first current blocking device such that the conducting direction of the first current blocking device corresponds to the predetermined current direction.

3. The wind power plant collector system according to claim 1, wherein the second current blocking device has a blocking direction in which current flow is substantially blocked and a conducting direction in which current is conducted, wherein the second pole of the DC collector grid is connected to a second terminal of the common converter via the second current blocking device such that the conducting direction of the second current blocking device corresponds to the predetermined current direction.

4. The wind power plant collector system according to claim 2, wherein the plurality of diodes of the first current blocking device and/or the second current blocking device, respectively, are connected in parallel to provide conduction of current in the conducting direction, and are connected in series to increase a breakdown voltage.

5. The wind power plant collector system according to claim 2, wherein the first current blocking device and/or the second current blocking device is connected closer to the common converter than to each of the one or more wind turbines, directly adjacent to the common converter.

6. The wind power plant collector system according to claim 2, wherein the wind power plant collector system further comprises a bypass element, connected in parallel to the first current blocking device and/or the second current blocking device.

7. The wind power plant collector system according to claim 6, wherein the bypass element is configured to provide a bypass current flow in the blocking direction of the respective first current blocking device or the second current blocking device, the bypass current being smaller than a current in the conducting direction of the respective first current blocking device or the second current blocking device at nominal operating conditions.

8. The wind power plant collector system according to claim 1, wherein the common converter is a DC to AC converter, the common converter being configured to convert DC electrical power received from the DC collector grid to AC electrical power and to supply the converted AC electrical power to the load, the load including an AC power grid.

9. The wind power plant collector system according to claim 1, wherein the common converter is a voltage source converter.

10. The wind power plant collector system according to claim 1, wherein the common converter comprises semiconductor switches configured to perform the conversion of the received DC electrical power, wherein the common converter is not capable of interrupting fault currents flowing towards the DC collector grid.

11. The wind power plant collector system according to claim 1, wherein the DC collector grid having the symmetrical monopole topology has no earth return.

12. The wind power plant collector system according to claim 1, further comprising an DC to DC converter connected between the at least one wind turbine and the DC collector grid.

13. The wind power plant collector system according to claim 1, wherein the DC collector grid includes at least two strings connected in parallel, wherein in each string, at least one wind turbine is connected to the DC collector grid.

14. A wind power plant, comprising:
at least one wind turbine;
a wind power plant collector system including:
a DC collector grid, wherein the DC collector grid has a symmetrical monopole topology including a first pole and a second pole of opposite polarity, wherein the DC collector grid is configured to collect electrical power generated by the one or more wind turbines and to transport the collected electrical power to a common converter by a DC current having a predetermined current direction in the DC collector grid; and
a first current blocking device and a second current blocking device positioned within the DC collector grid, the first current blocking device and the second current blocking device each having a plurality of diodes connectable in series and parallel in between input terminals and output terminals of the first current blocking device and the second current blocking device, respectively;
wherein the common converter is connected to the DC collector grid, the common converter being configured to convert DC electrical power received from the DC collector grid and to provide the converted electrical power to a load;
wherein, in normal operating conditions, current flows from positive terminals of the one or more wind turbines directly to the plurality of diodes of the first current blocking device.

15. A method of collecting electrical power generated by one or more wind turbines of a wind power plant, the method comprising:
collecting electrical power generated by the one or more wind turbines by a DC collector grid, wherein the DC collector grid has a symmetrical monopole topology including a first pole and a second pole of opposite polarity, and a first current blocking device and a second current blocking device positioned within the DC collector grid, the first current blocking device and the second current blocking device each having a plurality of diodes connectable in series and parallel in between input terminals and output terminals of the first current blocking device and the second current blocking device, respectively, wherein, in normal operating conditions, current flows from positive terminals of the one or more wind turbines directly to the plurality of diodes of the first current blocking device;
transporting the collected electrical power to a common converter by a DC current having a predetermined current direction in the DC collector grid;
converting, by the common converter connected to the DC collector grid, DC electrical power received by the common converter from the DC collector grid; and
providing the converted electrical power to a load.

* * * * *